(12) United States Patent
Huang

(10) Patent No.: US 11,846,253 B2
(45) Date of Patent: Dec. 19, 2023

(54) INJECTOR WITH INJECTOR ELEMENTS IN CIRCUMFERENTIAL ROWS THAT ALTERNATE BETWEEN COUNTER-CLOCKWISE AND CLOCKWISE SWIRL

(71) Applicant: Aerojet Rocketdyne, Inc., Sacramento, CA (US)

(72) Inventor: Yaping (Alan) Huang, Folsom, CA (US)

(73) Assignee: AEROJET ROCKETDYNE, INC., Canoga Park, CA (US)

( * ) Notice: Subject to any disclaimer, the term of this patent is extended or adjusted under 35 U.S.C. 154(b) by 292 days.

(21) Appl. No.: 17/286,623

(22) PCT Filed: Oct. 30, 2018

(86) PCT No.: PCT/US2018/058128
§ 371 (c)(1),
(2) Date: Apr. 19, 2021

(87) PCT Pub. No.: WO2020/091738
PCT Pub. Date: May 7, 2020

(65) Prior Publication Data
US 2021/0363940 A1 Nov. 25, 2021

(51) Int. Cl.
*F02K 9/52* (2006.01)
*F02K 9/60* (2006.01)
(Continued)

(52) U.S. Cl.
CPC .................. *F02K 9/52* (2013.01); *F02K 9/60* (2013.01); *F23R 3/34* (2013.01); *F23R 3/343* (2013.01);
(Continued)

(58) Field of Classification Search
CPC .... F02K 9/52; F23R 3/34; F23R 3/343; F23R 3/346; F23R 3/58
See application file for complete search history.

(56) References Cited

U.S. PATENT DOCUMENTS 3,468,487 A 9/1969 Warren
4,116,383 A * 9/1978 Johnson .................. B01F 25/45
239/557
(Continued)

FOREIGN PATENT DOCUMENTS

CN 103867340 7/2017
GB 1289934 9/1972

OTHER PUBLICATIONS

International Preliminary Report on Patentability for International Application No. PCT/US2018/058128 dated May 14, 2021.
International Search Report and Written Opinion for International Application No. PCT/US2018/058128 completed Jun. 27, 2019.

*Primary Examiner* — Kyle Robert Thomas

(57) ABSTRACT

An injector for a liquid rocket engine includes an array of injector elements. Each injector element includes a central passage and a plurality of peripheral transverse passages. The central passages are configured to provide axial injection flow and the peripheral transverse passages are configured to provide swirl injection flow about the axial injection flow. A portion of the injector elements are configured to provide the swirl injection flow in a clockwise direction and another portion of the injector elements are configured to provide the swirl injection flow in a counter-clockwise direction. The injector elements are arranged to form a plurality of circumferential rows. The injector elements of each individual circumferential row are either all of the clockwise direction or all of the counter-clockwise direction. At least one of the circumferential rows is of the clockwise
(Continued)

direction and at least one of the circumferential rows is of the counter-clockwise direction.

11 Claims, 4 Drawing Sheets

(51) Int. Cl.
    *F23R 3/58*         (2006.01)
    *F23R 3/34*         (2006.01)

(52) U.S. Cl.
    CPC ................ *F23R 3/346* (2013.01); *F23R 3/58* (2013.01); *F05D 2240/40* (2013.01); *F05D 2250/37* (2013.01)

(56) References Cited

U.S. PATENT DOCUMENTS

| | | | | |
|---|---|---|---|---|
| 4,971,768 | A * | 11/1990 | Ealba | F15D 1/0015 |
| | | | | 422/177 |
| 5,172,548 | A * | 12/1992 | Dubedout | F02K 9/52 |
| | | | | 60/265 |
| 6,244,040 | B1 | 6/2001 | Adzhian et al. | |
| 6,351,939 | B1 * | 3/2002 | Buddenbohm | B64G 1/401 |
| | | | | 60/204 |
| 6,360,525 | B1 * | 3/2002 | Senior | F23R 3/12 |
| | | | | 60/776 |
| 6,918,243 | B2 * | 7/2005 | Fisher | F02K 9/95 |
| | | | | 60/213 |
| 9,500,368 | B2 * | 11/2016 | Ryan | F23R 3/14 |
| 2004/0050982 | A1 * | 3/2004 | Sprouse | F23D 17/002 |
| | | | | 239/596 |

* cited by examiner

INJECTOR WITH INJECTOR ELEMENTS IN CIRCUMFERENTIAL ROWS THAT ALTERNATE BETWEEN COUNTER-CLOCKWISE AND CLOCKWISE SWIRL

STATEMENT REGARDING FEDERALLY SPONSORED RESEARCH OR DEVELOPMENT

This invention was made with government support under contract number FA9300-07-C-001 awarded by the United States Air Force. The government has certain rights in the invention.

BACKGROUND

Liquid propellant rocket engines may be powered by a fuel propellant and an oxidizer propellant. The fuel and oxidizer are typically provided to an injector, which has a plurality of injector elements that introduce the propellants into a combustion chamber for combustion. The combustion products are then exhausted through a nozzle downstream of the combustion chamber to provide thrust.

SUMMARY

An injector for a liquid rocket engine according to an example of the present disclosure includes an array of injector elements. Each injector element has a central passage that defines a central axis and a plurality of peripheral transverse passages. The central passages are configured to provide axial injection flow and the peripheral transverse passages are configured to provide swirl injection flow about the axial injection flow. A portion of the injector elements are configured to provide the swirl injection flow in a clockwise direction and another portion of the injector elements are configured to provide the swirl injection flow in a counter-clockwise direction. The injector elements are arranged to form a plurality of circumferential rows. The injector elements of each one of the circumferential rows are either all of the clockwise direction or all of the counter-clockwise direction, and there is at least one circumferential row of the clockwise direction and at least one circumferential row of the counter-clockwise direction.

In a further embodiment of any of the foregoing embodiments, each of the injector elements includes a first tube that provides the central passage and a second, outer tube situated at an end of the first tube so as to provide an annular space there between. The peripheral transverse passages extends through the second tube and opening to the annular space.

In a further embodiment of any of the foregoing embodiments, the peripheral transverse passages are provided in two circumferential rows around the second tube.

In a further embodiment of any of the foregoing embodiments, the second tube extends beyond the end of the first tube to define a cup region between the end of the first tube and an end of the second tube.

In a further embodiment of any of the foregoing embodiments, the circumferential rows alternate between the counter-clockwise direction and the clockwise direction.

In a further embodiment of any of the foregoing embodiments, the circumferential rows include at least two consecutive circumferential rows that are either the clockwise direction or the counter-clockwise direction.

In a further embodiment of any of the foregoing embodiments, the circumferential rows include a group of circumferential rows that alternate between the counter-clockwise direction and the clockwise direction and at least two consecutive circumferential rows that are either the clockwise direction or the counter-clockwise direction. The at least two consecutive circumferential rows are radially inward of the group of circumferential rows that alternate.

In a further embodiment of any of the foregoing embodiments, the group of circumferential rows that alternate between the counter-clockwise direction and the clockwise direction includes at least four circumferential rows.

In a further embodiment of any of the foregoing embodiments, the circumferential rows include a group of circumferential rows that alternate between the counter-clockwise direction and the clockwise direction and a group of consecutive circumferential rows that are either the clockwise direction or the counter-clockwise direction.

In a further embodiment of any of the foregoing embodiments, one of the injector elements is arranged as a single, center injector element and the circumferential rows are arranged concentrically about the single, center injector element.

A liquid rocket engine according to an example of the present disclosure includes a combustion chamber, a nozzle attached with the combustion chamber, and an injector attached with the combustion chamber. The injector includes an array of injector elements. Each injector element includes a central passage that defines a central axis and a plurality of peripheral transverse passages. The central passages are configured to provide axial injection flow and the peripheral transverse passages are configured to provide swirl injection flow about the axial injection flow. A portion of the injector elements are configured to provide the swirl injection flow in a clockwise direction and another portion of the injector elements are configured to provide the swirl injection flow in a counter-clockwise direction. The injector elements are arranged to form a plurality of circumferential rows. The injector elements of each one of the circumferential rows are either all of the clockwise direction or all of the counter-clockwise direction, and there is at least one circumferential row of the clockwise direction and at least one circumferential row of the counter-clockwise direction.

In a further embodiment of any of the foregoing embodiments, the nozzle is a converging-diverging nozzle.

A further embodiment of any of the foregoing embodiments includes a fuel source and an oxidizer source.

In a further embodiment of any of the foregoing embodiments, each of the injector elements includes a first tube that provides the central passage and a second, outer tube situated at an end of the first tube so as to provide an annular space there between. The peripheral transverse passages extends through the second tube and opening to the annular space.

In a further embodiment of any of the foregoing embodiments, the circumferential rows alternate between the counter-clockwise direction and the clockwise direction.

In a further embodiment of any of the foregoing embodiments, the circumferential rows include at least two consecutive circumferential rows that are either the clockwise direction or the counter-clockwise direction.

In a further embodiment of any of the foregoing embodiments, the circumferential rows include a group of circumferential rows that alternate between the counter-clockwise direction and the clockwise direction and at least two consecutive circumferential rows that are either the clockwise direction or the counter-clockwise direction. The at least two consecutive circumferential rows are radially inward of the group of circumferential rows that alternate.

In a further embodiment of any of the foregoing embodiments, the group of circumferential rows that alternate between the counter-clockwise direction and the clockwise direction includes at least four circumferential rows.

In a further embodiment of any of the foregoing embodiments, the circumferential rows include a group of circumferential rows that alternate between the counter-clockwise direction and the clockwise direction and a group of consecutive circumferential rows that are either the clockwise direction or the counter-clockwise direction.

An injector according to an example of the present disclosure includes an array of injector elements. Each injector element includes a central passage that defines a central axis and a plurality of peripheral transverse passages. The central passages are configured to provide axial injection flow and the peripheral transverse passages are configured to provide swirl injection flow about the axial injection flow. A portion of the injector elements are configured to provide the swirl injection flow in a clockwise direction and another portion of the injector elements are configured to provide the swirl injection flow in a counter-clockwise direction. The injector elements are arranged to form a plurality of rows. The injector elements of each one of the rows are either all of the clockwise direction or all of the counter-clockwise direction, and there is at least one row of the clockwise direction and at least one row of the counter-clockwise direction.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
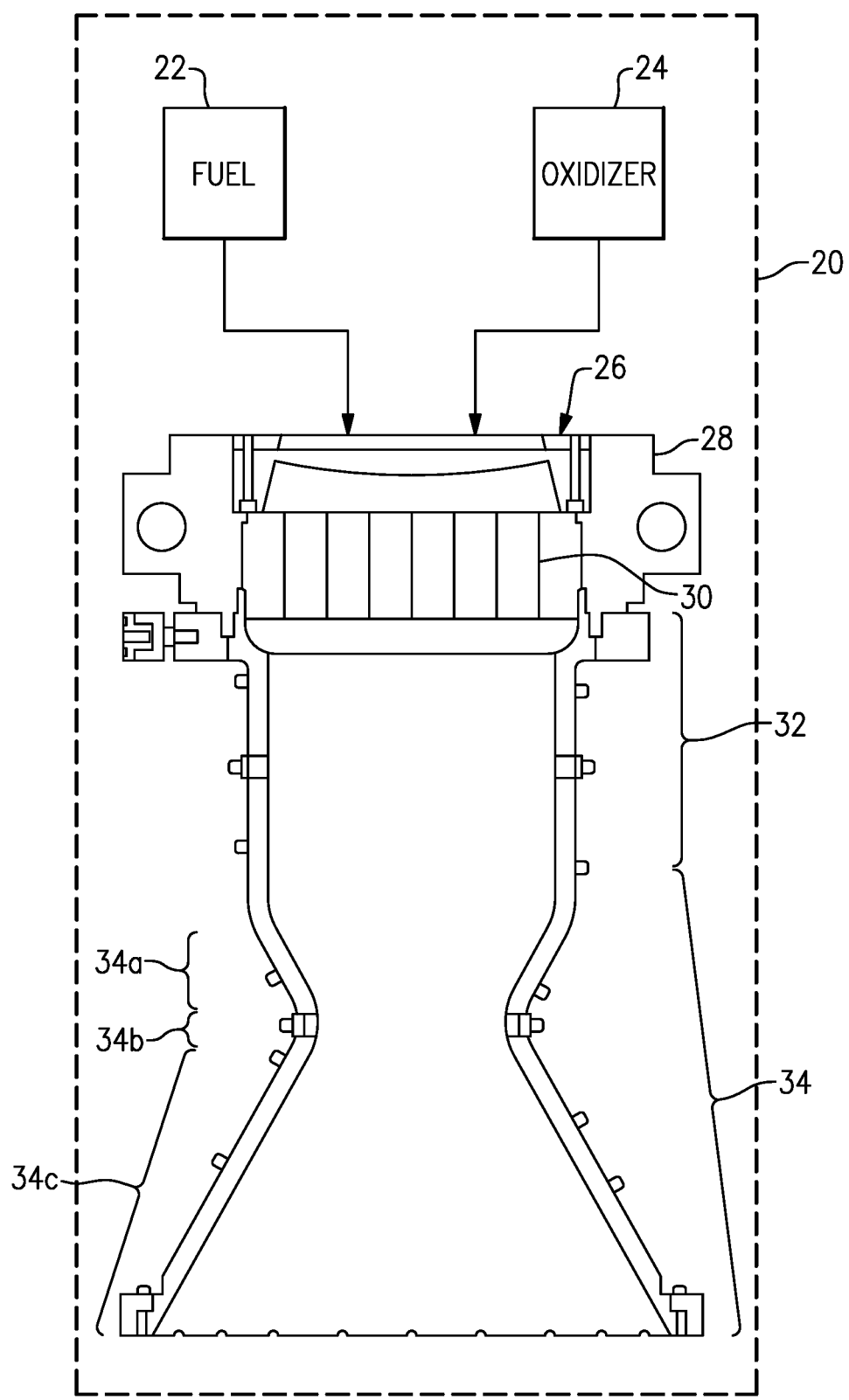
FIG. 1 illustrates an example liquid rocket engine.

FIG. 1 schematically illustrates the thrust chamber of a liquid propellant rocket engine 20. As will be appreciated, there are many different types of liquid propellant engines to which this disclosure may apply. In this regard, although not shown, the engine 20 will typically have plumbing for delivering fuel and oxidizer propellants, as well as pumps and valves for controlling propellant delivery.

In this example, the engine 20 is operable to pump fuel (e.g., liquid hydrogen or liquid hydrocarbon) from a fuel source 22 and oxidizer (e.g., oxidizer-rich turbine exhaust hot gas) from an oxidizer source 24 to an injector 26. The injector 26 may generally include an injector housing 28 and injector elements 30 that are operable to introduce the fuel and oxidizer into a downstream combustion chamber 32 for combustion. For example, the combustion chamber 32 is cylindrical and is formed of a metal alloy. The combustion products are then exhausted through a nozzle 34 to produce thrust. In the example shown, the nozzle 34 is a converging-diverging nozzle that includes a convergent section 34a, a throat section 34b, and a divergent section 34c. The nozzle 34 is attached to the combustion chamber 32, and the combustion chamber 32 is attached to the injector 30.

Figure 2:
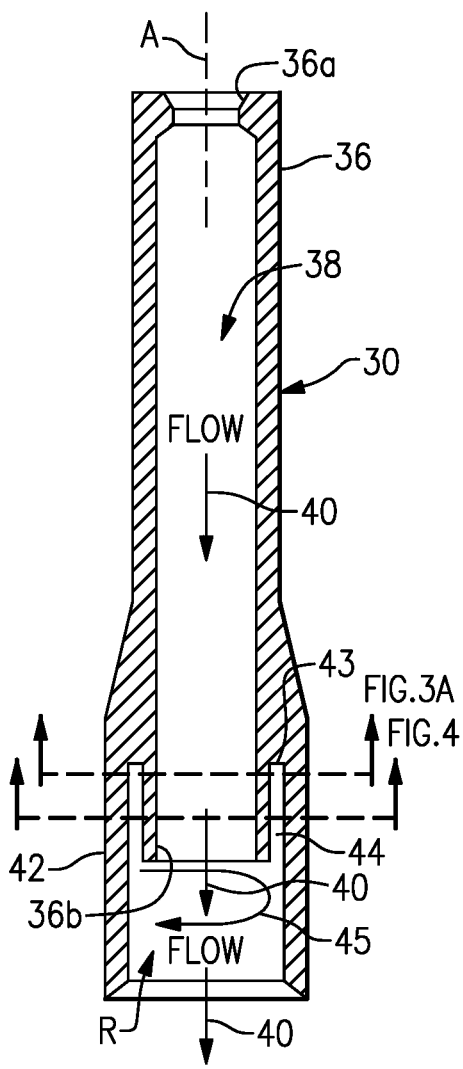
FIG. 2 illustrates a representative example of an injector element of an injector of the liquid rocket engine.

FIG. 2 illustrates a representative one of the injector elements 30 of the injector 26. Each injector element 30 is disposed about a central axis A and includes a tube 36 that provides a central passage 38. The central passage 38 is configured to provide axial injection flow, as represented at 40, of the oxidizer gas. In this regard, the tube 36 includes an inlet 36a at one end thereof and an outlet 36b at the opposite end thereof. The inlet 36a is connected to the oxidizer source 24.

A second tube 42, which most typically is integral with the first tube 36, is provided at the second end of the first tube 36 and is coaxial therewith. The second tube 42 is diametrically larger than the first tube 36 and thus provides an annular space 44 between the outer diameter surface at the second end of the first tube 36 and the inner diameter surface of the second tube 42. Since the tubes are integral, or at least attached, the annular space 44 terminates at location 43. The second tube 42 extends beyond the second end of the first tube 36 and thereby defines a cup region R between the ends of the tubes 36 and 42.

Figure 3A:
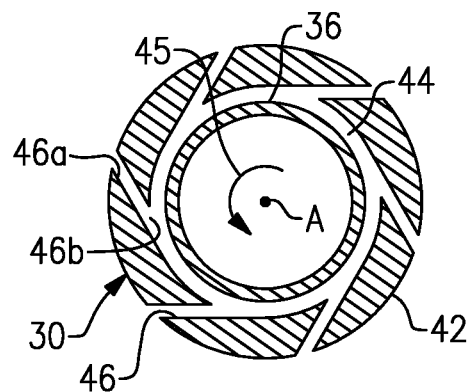
FIG. 3A illustrates a sectioned view of the injector of FIG. 2 for counterclockwise swirl.
Figure 4:
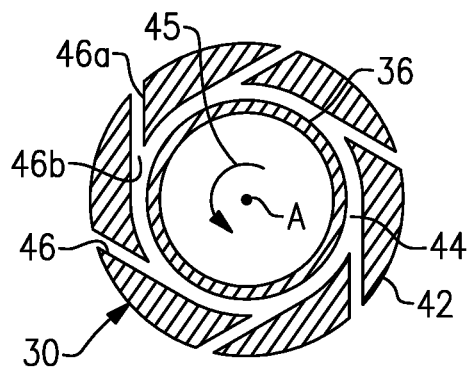
FIG. 4 illustrates another sectioned view of the injector element of FIG. 2.

As shown in the sectioned views in FIGS. 3A and 4, the second tube 42 includes a plurality of peripheral transverse passages 46. In this example, each passage 46 is linear and extends tangentially to the annular space 44 between the first tube 36 and the second tube 42. Each passage 46 includes an inlet 46a at or near the outer diameter surface of the second tube 42 and an outlet 46b that opens at the inner diameter surface of the second tube 42 to the annular space 44. The inlets 46a may be connected with channels or a manifold to deliver the fuel from the fuel source 22 thereto.

As represented in the cross-sections in FIGS. 3A and 4, the injector element 30 includes two circumferential rows of the passages 46. In this example, the tangential orientation of the passages 46 are configured to introduce flow of the fuel into the annular space 44 in a tangential direction, thereby producing a swirl injection flow of fuel around the annular space 44 and, eventually, around the axial injection flow 40 of the oxidizer in the cup region R from the first tube 36. Thus, depending on the slope orientation of the passages 46, the swirl injection flow, represented at 45, can be in either a clockwise direction or a counter-clockwise direction when viewing the injector element 30 axially from the side of the combustion chamber 32. As shown in FIGS. 3A and 4, the passages 46 are oriented to provide the swirl injection flow in the counter-clockwise direction (exclusively) and thus represent an injector element 30 that is of the counter-clockwise direction.

Figure 3B:
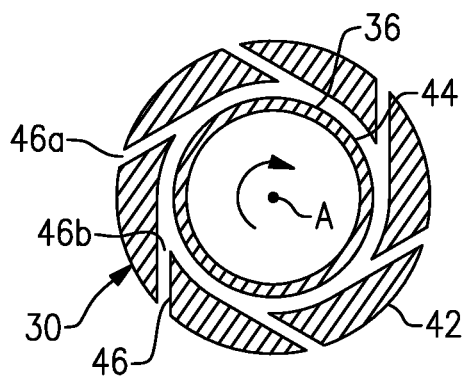
FIG. 3B illustrates a sectioned view of an injector for clockwise swirl.

The injector element 30 for the clockwise direction is of the same construction as described above except that the passages 46 are oriented in the opposite direction. FIG. 3B illustrates an example in which the passages 46 are oriented in the opposite direction to provide the swirl injection flow in the clockwise direction (exclusively).

As will be described in further detail below, a portion of the injector elements 30 of the injector 26 can be configured with passages 46 to provide the swirl injection flow exclusively in the counter-clockwise direction, while other injector elements 30 can be configured to provide the swirl injection flow exclusively in the clockwise direction.

Figure 5:
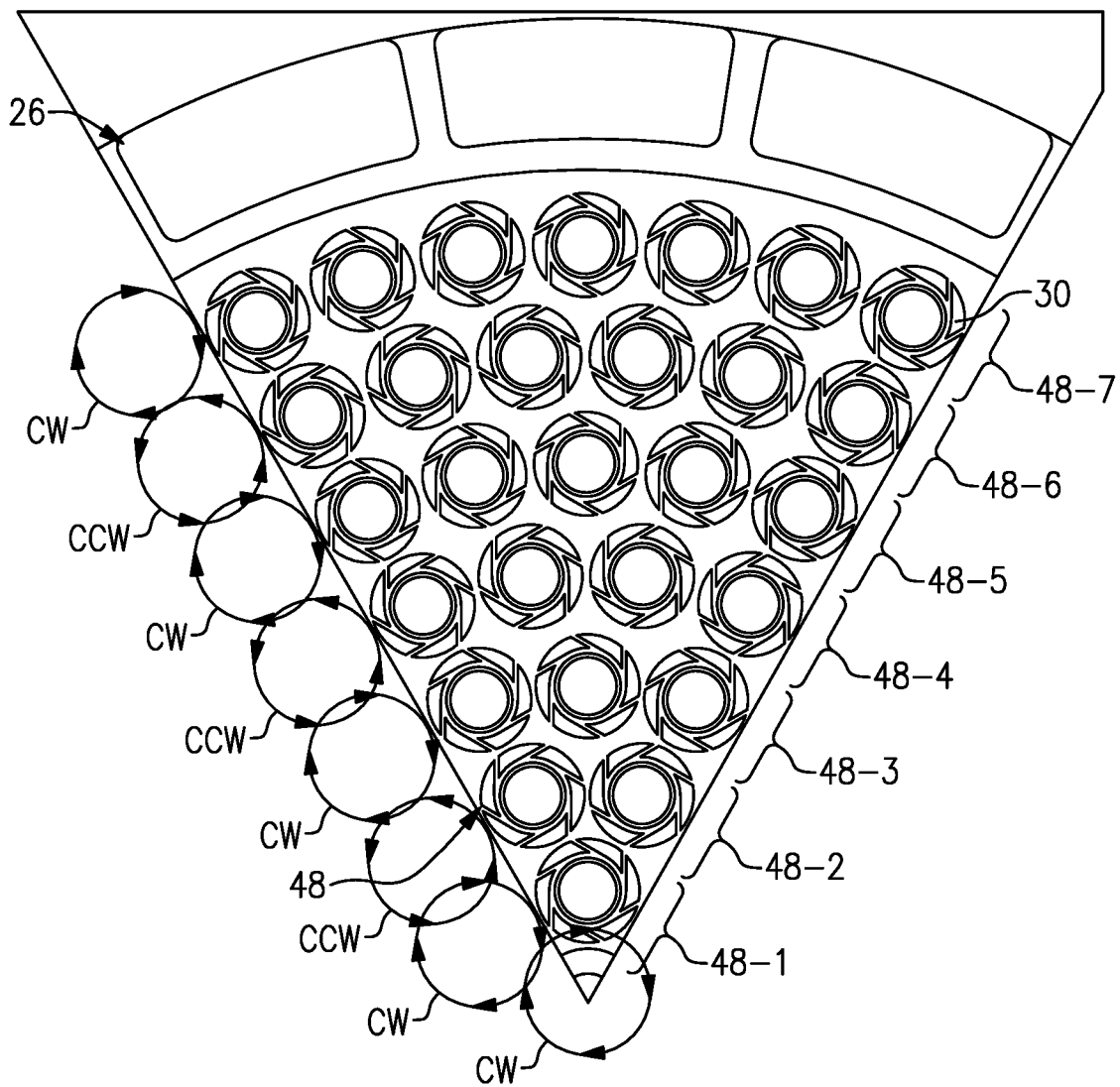
FIG. 5 illustrates a representative section of the injector in axial view.

FIG. 5 illustrates a representative section of the injector 26 viewed from an axial direction from the top of the combustion chamber 32. In this example, a portion of the injector elements 30 are configured to provide the swirl injection flow in the counter-clockwise direction (e.g., FIG. 3A) and another portion of the injector elements 30 are configured to provide the swirl injection flow in the clockwise direction (e.g., FIG. 3B). For instance, the injector elements 30 within each individual row 48 are either all of the clockwise direction or all of the counter-clockwise direction. In the example shown, rows 48 that are of the clockwise direction are represented by a circular arrow designated "CW" and rows 48 that are of the counter-clockwise direction are represented by a circular arrow designated "CCW."

In this example, a 60° wedge of the injector 26 is shown. The wedge represents a repeat unit of the injector 26 such that six identical wedges are assembled together to form the full circular configuration of the injector 26. As shown, the injector elements 30 can be seen on the back face of the injector 26. The injector elements 30 are arranged in an array with one, single injector element 30a at the center and then the circumferential rows 48 of the injector elements 30, represented as rows 48-1, 48-2, 48-3, 48-4, 48-5, 48-6, and 48-7 (collectively "rows 48"). The injector elements 30 are generally uniformly spaced apart within the rows 48, and the rows 48 are concentric about the center injector element 30a.

FIG. 5 illustrates an example with alternatively reversed swirl (ARS) between adjacent circumferential rows of the injector 26. In this example, all of the circumferential rows 48-1, 48-2, 48-3, 48-4, 48-5, 48-6, and 48-7 are of alternating configuration between the clockwise direction and the counter-clockwise direction between adjacent rows. Other contemplated configurations include alternating only the two outermost circumferential rows, followed by consecutive rows that are all of either the clockwise direction or the counter-clockwise direction. As will be appreciated, in any of the examples herein, the inverse patterns of the clockwise direction or the counter-clockwise direction is also contemplated.

Figure 6:
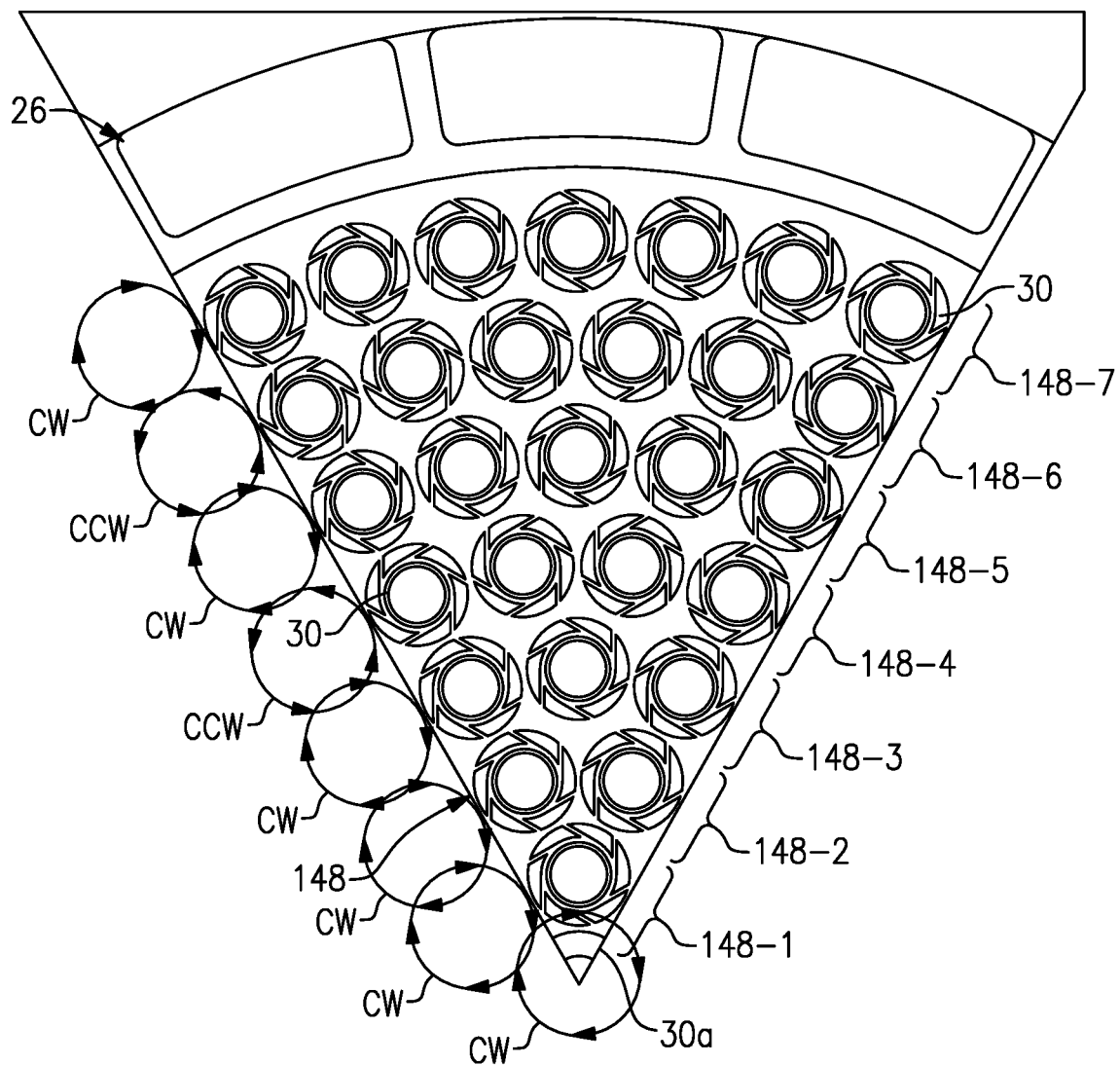
FIG. 6 illustrates another example of the representative section of an injector in axial view.

FIG. 6 illustrates another example with partial ARS (PARS). In this example, the center injector element 30a is of the clockwise direction, and is followed by, moving radially outward, at least two, but in this example three consecutive circumferential rows 148-1, 148-2, and 148-3 that are of the clockwise direction. The final outer four circumferential rows 148-4, 148-5, 148-6, and 148-7 alternate between the counter-clockwise direction and the clockwise direction between adjacent rows.

The following comparative example between a baseline injector in which all of the injector elements swirl in the same direction and ARS is based on steady state reacting flow computational fluid dynamics (CFD) solutions for the internal flow inside the thrust chamber assembly (the combination of injector 26, chamber 32 and nozzle 34) at high pressure conditions (typically around 3000 psi) fed with liquid fuel and oxidizer-rich turbine exhaust hot gas, which is at supercritical pressure conditions for both fuel and oxidizer. The fuel streams injected from each injector element tend to swirl around the central axial flow of the oxidizer. Between the adjacent circumferential rows of injector elements, the baseline injector has shearing interaction, whereas the ARS has tearing interaction. Under the shearing interaction, in cross-section, the oxidizer maintains a relatively circular shape as it emanates from the injector into and along the combustion chamber. Under the tearing interaction however, the cross-section of the oxidizer stream tends to be elongated in directions transverse to the central axes A of the injector elements 30, thereby increasing the surface area for faster mixing and burning, hence shortening the axial length of the oxidizer stream. Therefore, in the outermost rows, compared to the baseline injector, the shorter oxidizer streams of the ARS would not penetrate and break the fuel film cooling layer on the chamber wall as much, thus the occurrence of hot streaks at the combustor walls may be significantly reduced.

The following comparative example between the ARS and PARS is based on the steady state reacting flow CFD solutions for the internal flow inside the thrust chamber assembly at the same condition. The partial ARS configurations have reverse swirl in three, two, or one even number rows. It was found that reversal in two rows has the best energy release efficiency (ERE), and very closely compared wall thermal condition. Consider that each injector element generates a stream tube, in which fuel stream and oxidizer stream are initial stratified but eventually mixed and burned, and to be mixed with the fluid outside these stream tubes. The ERE optimal comes because of the competing act between the in-stream tube mixing (ISTM) and between-stream tube mixing (BSTM). The ARS promotes ISTM, hence the thermal expansion that accelerates the fluid particles' axial motion, leading to less residence time for the BSTM.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An injector for a liquid rocket engine, comprising:
   an array of injector elements, each injector element includes a central passage defining a central axis and a plurality of peripheral transverse passages, the central passages are configured to provide axial injection flow and the peripheral transverse passages are configured to provide swirl injection flow about the axial injection flow, wherein a portion of the injector elements are configured to provide the swirl injection flow in a clockwise direction and another portion of the injector elements are configured to provide the swirl injection flow in a counter-clockwise direction, and
   the injector elements are arranged to form a plurality of circumferential rows, the injector elements of each one of the circumferential rows are either all of the clockwise direction or all of the counter-clockwise direction, the circumferential rows include a group of circumferential rows that alternate between the counter-clockwise direction and the clockwise direction and at least two consecutive circumferential rows that are either the clockwise direction or the counter-clockwise direction, and the at least two consecutive circumferential rows are radially inward of the group of circumferential rows that alternate.

2. The injector as recited in claim 1, wherein each of the injector elements includes a first tube that provides the central passage and a second, outer tube situated at an end of the first tube so as to provide an annular space there between, the peripheral transverse passages extending through the second tube and opening to the annular space.

3. The injector as recited in claim 2, wherein the peripheral transverse passages are provided in two circumferential rows around the second tube.

4. The injector as recited in claim 2, wherein the second tube extends beyond the end of the first tube to define a cup region between the end of the first tube and an end of the second tube.

5. The injector as recited in claim 1, wherein the group of circumferential rows that alternate between the counter-clockwise direction and the clockwise direction includes at least four circumferential rows.

6. The injector as recited in claim 1, wherein one of the injector elements is arranged as a single, center injector element and the circumferential rows are arranged concentrically about the single, center injector element.

7. A liquid rocket engine comprising:
a combustion chamber;
a nozzle attached with the combustion chamber; and
an injector attached with the combustion chamber, the injector includes
an array of injector elements, each injector element includes a central passage defining a central axis and a plurality of peripheral transverse passages, the central passages are configured to provide axial injection flow and the peripheral transverse passages are configured to provide swirl injection flow about the axial injection flow, wherein a portion of the injector elements are configured to provide the swirl injection flow in a clockwise direction and another portion of the injector elements are configured to provide the swirl injection flow in a counter-clockwise direction, and the injector elements are arranged to form a plurality of circumferential rows, the injector elements of each one of the circumferential rows are either all of the clockwise direction or all of the counter-clockwise direction, the circumferential rows including a group of circumferential rows that alternate between the counter-clockwise direction and the clockwise direction and at least two consecutive circumferential rows that are either the clockwise direction or the counter-clockwise direction, and the at least two consecutive circumferential rows are radially inward of the group of circumferential rows that alternate.

8. The liquid rocket engine as recited in claim 7, wherein the nozzle is a converging-diverging nozzle.

9. The liquid rocket engine as recited in claim 7, further comprising a fuel source and an oxidizer source.

10. The liquid rocket engine as recited in claim 7, wherein each of the injector elements includes a first tube that provides the central passage and a second, outer tube situated at an end of the first tube so as to provide an annular space there between, the peripheral transverse passages extending through the second tube and opening to the annular space.

11. The liquid rocket engine as recited in claim 7, wherein the group of circumferential rows that alternate between the counter-clockwise direction and the clockwise direction includes at least four circumferential rows.

* * * * *